US008496521B2

(12) United States Patent
Randall

(10) Patent No.: US 8,496,521 B2
(45) Date of Patent: Jul. 30, 2013

(54) GAMING SYSTEM AND METHOD HAVING WAGER ALLOCATION

(71) Applicant: IGT, Reno, NV (US)

(72) Inventor: Dov Liam Randall, Las Vegas, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 13/732,760

(22) Filed: Jan. 2, 2013

(65) Prior Publication Data

US 2013/0122990 A1 May 16, 2013

Related U.S. Application Data

(63) Continuation of application No. 13/279,021, filed on Oct. 21, 2011, now Pat. No. 8,360,852, which is a continuation of application No. 12/017,246, filed on Jan. 21, 2008, now Pat. No. 8,066,564, which is a continuation of application No. 10/861,072, filed on Jun. 3, 2004, now Pat. No. 7,387,570.

(30) Foreign Application Priority Data

Jun. 6, 2003 (GB) .................................. 0313012.7

(51) Int. Cl.
*G07F 17/34* (2006.01)
*A63F 13/00* (2006.01)

(52) U.S. Cl.
USPC .......... 463/20; 463/25; 273/143 R; 273/138.2

(58) Field of Classification Search
USPC ..... 273/143 R, 292, 274, 309, 138.2; 463/20, 463/12, 13, 25
See application file for complete search history.

(56) References Cited

U.S. PATENT DOCUMENTS

| | | | |
|---|---|---|---|
| 3,834,712 | A | 9/1974 | Cox |
| 4,184,683 | A | 1/1980 | Hooker |
| 4,198,052 | A | 4/1980 | Gauselmann |
| 4,448,419 | A | 5/1984 | Telnaes |
| 4,582,324 | A | 4/1986 | Koza et al. |
| 4,624,459 | A | 11/1986 | Kaufman |
| 4,648,600 | A | 3/1987 | Olliges |
| 4,669,731 | A | 6/1987 | Clarke |
| 4,695,053 | A | 9/1987 | Vazquez, Jr. et al. |

(Continued)

FOREIGN PATENT DOCUMENTS

| | | | |
|---|---|---|---|
| AU | 199716432 | B2 | 9/1997 |
| AU | A-50327/96 | | 10/1997 |

(Continued)

OTHER PUBLICATIONS

Austin Powers Poker Advertisement written by IGT, published in 2001.

Bally Slot Machines Electro-Mechanicals 1964-1980 Book [in part], Revised 3rd Edition written by Marshall Fey.

Barroso, Luiz Andre, Sasan Iman, Jaeheon Jeong, Koray Oner, and Michel Dubois. RPM: A Rabpid Prototyping Engine for Multiprocessor Systems. IEEE Computer, Feb. 1995, pp. 26-34.

(Continued)

*Primary Examiner* — Benjamin Layno
(74) *Attorney, Agent, or Firm* — Neal, Gerber & Eisenberg LLP

(57) ABSTRACT

A gaming system which displays a plurality of reels. Each reel is associated with a display area which displays a symbol. A wager is allocated to each one of the display areas. An award is determined based, at least in part, on such allocation.

20 Claims, 2 Drawing Sheets

U.S. PATENT DOCUMENTS 4,826,169 A 5/1989 Bessho et al.
4,838,552 A 6/1989 Hagiwara
4,874,173 A 10/1989 Kishishita
4,991,848 A 2/1991 Greenwood et al.
5,085,436 A 2/1992 Bennett
5,102,134 A 4/1992 Smyth
5,102,137 A 4/1992 Ekiert
5,116,055 A 5/1992 Tracy
5,163,131 A 11/1992 Row et al.
5,178,390 A 1/1993 Okada
5,205,555 A 4/1993 Hamano
5,209,479 A 5/1993 Nagao et al.
5,265,877 A 11/1993 Boylan et al.
5,277,424 A 1/1994 Wilms
5,342,047 A 8/1994 Heidel et al.
5,344,144 A 9/1994 Canon
5,393,061 A 2/1995 Manship et al.
5,397,125 A 3/1995 Adams
5,415,404 A * 5/1995 Joshi et al. ...................... 463/13
5,437,451 A 8/1995 Fulton
5,449,173 A 9/1995 Thomas et al.
5,456,465 A 10/1995 Durham
5,511,781 A 4/1996 Wood et al.
5,560,603 A 10/1996 Seelig et al.
5,569,084 A 10/1996 Nicastro et al.
5,580,053 A 12/1996 Crouch
5,584,764 A 12/1996 Inoue
5,609,524 A 3/1997 Inoue
5,611,535 A 3/1997 Tiberio
5,645,485 A 7/1997 Clapper, Jr.
5,647,798 A 7/1997 Falciglia
5,695,402 A 12/1997 Stupak
5,697,843 A 12/1997 Manship et al.
5,704,835 A 1/1998 Dietz, II
5,711,525 A 1/1998 Breeding
5,722,891 A 3/1998 Inoue
5,732,948 A 3/1998 Yoseloff
5,743,799 A 4/1998 Houriet, Jr. et al.
5,766,074 A 6/1998 Cannon et al.
5,769,716 A 6/1998 Saffari et al.
5,779,544 A 7/1998 Seelig et al.
5,779,549 A 7/1998 Walker et al.
5,788,573 A 8/1998 Baerlocher et al.
5,807,172 A 9/1998 Piechowiak
5,817,172 A 10/1998 Yamada et al.
5,823,874 A 10/1998 Adams
5,833,537 A 11/1998 Barrie
5,848,932 A 12/1998 Adams
5,851,010 A 12/1998 Feinberg
5,851,148 A 12/1998 Brune et al.
5,855,514 A 1/1999 Kamille
5,882,261 A 3/1999 Adams
5,885,158 A 3/1999 Torango et al.
5,890,962 A 4/1999 Rakemoto
5,910,048 A 6/1999 Feinberg
5,911,418 A 6/1999 Adams
5,919,088 A 7/1999 Weiss
5,927,714 A 7/1999 Kaplan
5,947,820 A 9/1999 Morro et al.
5,954,335 A 9/1999 Moody
5,967,893 A 10/1999 Lawrence et al.
5,971,849 A 10/1999 Falciglia
5,976,016 A 11/1999 Moody et al.
5,980,384 A 11/1999 Barrie
5,984,781 A 11/1999 Sunaga
5,984,782 A 11/1999 Inoue
5,993,316 A 11/1999 Coyle et al.
5,997,400 A 12/1999 Seelig et al.
5,997,401 A 12/1999 Crawford
6,004,207 A 12/1999 Wilson, Jr. et al.
6,012,982 A 1/2000 Piechowialt et al.
6,012,983 A 1/2000 Walker et al.
6,015,344 A 1/2000 Kelly et al.
6,015,346 A 1/2000 Bennett
6,045,129 A 4/2000 Cooper
6,050,895 A 4/2000 Luciano
6,056,642 A 5/2000 Bennett
6,059,289 A 5/2000 Vancura
6,059,658 A 5/2000 Mangano et al.
6,062,980 A 5/2000 Luciano
6,089,976 A 7/2000 Schneider et al.
6,089,977 A 7/2000 Bennett
6,089,978 A 7/2000 Adams
6,093,102 A 7/2000 Bennett
6,102,400 A 8/2000 Scott et al.
6,102,798 A 8/2000 Bennett
6,110,041 A 8/2000 Walker et al.
6,113,098 A 9/2000 Adams
6,120,378 A 9/2000 Moody
6,126,542 A 10/2000 Fier
6,129,632 A 10/2000 Luciano
6,142,873 A 11/2000 Weiss et al.
6,142,874 A 11/2000 Kodachi et al.
6,149,156 A 11/2000 Feola
6,149,521 A 11/2000 Sanduski
6,155,925 A 12/2000 Giobbi et al.
6,158,741 A 12/2000 Koelling
6,159,095 A 12/2000 Frohm et al.
6,159,096 A 12/2000 Yoseloff
6,159,097 A 12/2000 Gura
6,159,098 A 12/2000 Slomiany et al.
6,162,121 A 12/2000 Morro et al.
6,168,520 B1 1/2001 Baerlocher et al.
6,168,522 B1 1/2001 Walker et al.
6,168,523 B1 1/2001 Piechowiak et al.
6,174,233 B1 1/2001 Sunaga et al.
6,174,235 B1 1/2001 Walker et al.
6,186,894 B1 2/2001 Mayeroff
6,190,254 B1 2/2001 Bennett
6,190,255 B1 2/2001 Thomas et al.
6,203,429 B1 3/2001 Demar et al.
6,210,277 B1 4/2001 Stefan
6,213,877 B1 4/2001 Walker et al.
6,220,959 B1 4/2001 Holmes
6,224,482 B1 5/2001 Bennett
6,224,483 B1 5/2001 Mayeroff
6,227,969 B1 5/2001 Yoseloff
6,227,971 B1 5/2001 Weiss
6,231,442 B1 5/2001 Mayeroff
6,231,445 B1 5/2001 Acres
6,234,879 B1 5/2001 Hasegawa et al.
6,234,897 B1 5/2001 Frohm et al.
6,238,287 B1 5/2001 Komori et al.
6,238,288 B1 5/2001 Walker et al.
6,241,607 B1 6/2001 Payne et al.
6,244,957 B1 6/2001 Walker et al.
6,251,013 B1 6/2001 Bennett
6,254,482 B1 7/2001 Walker et al.
6,261,128 B1 7/2001 Heim et al.
6,261,177 B1 7/2001 Bennett
6,261,178 B1 7/2001 Bennett
6,270,409 B1 8/2001 Shuster
6,270,412 B1 8/2001 Crawford et al.
6,290,600 B1 9/2001 Glasson
6,293,866 B1 9/2001 Walker et al.
6,299,165 B1 10/2001 Nagano
6,302,790 B1 10/2001 Brossard
6,302,791 B1 10/2001 Frohm et al.
6,309,299 B1 10/2001 Weiss
6,309,300 B1 10/2001 Glavich
6,311,976 B1 11/2001 Yoseloff et al.
6,312,331 B1 11/2001 Tamaki
6,312,334 B1 11/2001 Yoseloff
6,315,662 B1 11/2001 Jorasch et al.
6,319,124 B1 11/2001 Baerlocher et al.
6,328,649 B1 12/2001 Randall et al.
6,331,143 B1 12/2001 Yoseloff
6,334,814 B1 1/2002 Adams
6,334,864 B1 1/2002 Amplatz et al.
6,336,860 B1 1/2002 Webb
6,336,862 B1 1/2002 Byrne
6,340,158 B2 1/2002 Pierce et al.
6,346,043 B1 2/2002 Colin et al.
6,347,996 B1 2/2002 Gilmore et al.
RE37,588 E 3/2002 Ornstein
6,358,147 B1 3/2002 Jaffe et al.
6,364,766 B1 4/2002 Anderson et al.

| | | | | |
|---|---|---|---|---|
| 6,364,768 | B1 | 4/2002 | Acres et al. | |
| 6,368,216 | B1 | 4/2002 | Hedrick et al. | |
| 6,375,187 | B1 | 4/2002 | Baerlocher | |
| 6,375,567 | B1 | 4/2002 | Acres | |
| 6,398,218 | B1 | 6/2002 | Vancura | |
| 6,406,369 | B1 | 6/2002 | Baerlocher et al. | |
| 6,413,162 | B1 | 7/2002 | Baerlocher et al. | |
| 6,416,408 | B2 | 7/2002 | Tracy et al. | |
| 6,419,579 | B1 | 7/2002 | Bennett | |
| 6,428,412 | B1 | 8/2002 | Anderson et al. | |
| 6,439,995 | B1 | 8/2002 | Hughs-Baird et al. | |
| 6,443,837 | B1 | 9/2002 | Jaffe et al. | |
| 6,454,651 | B1 | 9/2002 | Yoseloff | |
| 6,464,582 | B1 | 10/2002 | Baerlocher et al. | |
| 6,471,208 | B2 | 10/2002 | Yoseloff et al. | |
| 6,481,713 | B2 | 11/2002 | Perrie et al. | |
| 6,491,584 | B2 | 12/2002 | Graham et al. | |
| 6,506,116 | B1 | 1/2003 | Sunaga et al. | |
| 6,506,118 | B1 | 1/2003 | Baerlocher et al. | |
| 6,533,660 | B2 | 3/2003 | Seelig et al. | |
| 6,547,242 | B1 | 4/2003 | Sugiyama et al. | |
| 6,551,187 | B1 | 4/2003 | Jaffe | |
| 6,558,254 | B2 | 5/2003 | Baelocher et al. | |
| 6,561,904 | B2 | 5/2003 | Locke et al. | |
| 6,569,016 | B1 | 5/2003 | Baerlocher | |
| 6,581,935 | B1 | 6/2003 | Odom | |
| 6,592,457 | B1 | 7/2003 | Frohm et al. | |
| 6,602,137 | B2 | 8/2003 | Kaminkow et al. | |
| 6,604,999 | B2 | 8/2003 | Ainsworth | |
| 6,607,438 | B2 | 8/2003 | Baerlocher et al. | |
| 6,632,141 | B2 | 10/2003 | Webb et al. | |
| 6,638,164 | B2 | 10/2003 | Randall et al. | |
| 6,641,477 | B1 | 11/2003 | Dietz, II | |
| 6,648,754 | B2 | 11/2003 | Baerlocher et al. | |
| 6,648,758 | B2 | 11/2003 | Bennett et al. | |
| 6,676,512 | B2 | 1/2004 | Fong et al. | |
| 6,692,356 | B2 | 2/2004 | Baerlocher et al. | |
| 6,702,673 | B2 | 3/2004 | Webb | |
| 6,719,630 | B1 | 4/2004 | Seelig et al. | |
| 6,731,313 | B1 | 5/2004 | Kaminkow | |
| 6,733,386 | B2 | 5/2004 | Cuddy et al. | |
| 6,824,465 | B2 | 11/2004 | Luciano, Jr. | |
| 6,855,055 | B2 | 2/2005 | Perrie et al. | |
| 2001/0009865 | A1 | 7/2001 | Demar et al. | |
| 2001/0041610 | A1 | 11/2001 | Luciano et al. | |
| 2002/0052233 | A1 | 5/2002 | Gauselmann | |
| 2002/0058545 | A1 | 5/2002 | Luciano | |
| 2002/0086725 | A1 | 7/2002 | Fasbender et al. | |
| 2003/0017868 | A1 | 1/2003 | Crawford | |
| 2003/0054875 | A1 | 3/2003 | Marks et al. | |
| 2003/0064786 | A1 | 4/2003 | Weiss | |
| 2003/0181234 | A1 | 9/2003 | Falciglia, Sr. | |
| 2003/0216165 | A1 | 11/2003 | Singer et al. | |
| 2004/0053657 | A1 | 3/2004 | Fiden et al. | |
| 2004/0053662 | A1 | 3/2004 | Pacey | |
| 2004/0058727 | A1 | 3/2004 | Marks et al. | |
| 2004/0106445 | A1 | 6/2004 | Perrie et al. | |
| 2004/0204214 | A1* | 10/2004 | Tucci | 463/13 |
| 2005/0009597 | A1 | 1/2005 | Daly | |
| 2005/0014553 | A1 | 1/2005 | Byrne | |
| 2005/0043081 | A1 | 2/2005 | Baerlocher | |
| 2005/0148378 | A1* | 7/2005 | Fasbender et al. | 463/13 |
| 2008/0058064 | A1* | 3/2008 | Okada | 463/20 |

FOREIGN PATENT DOCUMENTS

| | | | |
|---|---|---|---|
| AU | A-63553/98 | | 10/1998 |
| EP | 0 698 869 | | 2/1996 |
| EP | 0 798 676 | A1 | 10/1997 |
| EP | 0 874 337 | A1 | 10/1998 |
| EP | 0 945 837 | | 3/1999 |
| EP | 0 926 645 | A2 | 6/1999 |
| EP | 0 944 030 | A2 | 9/1999 |
| EP | 0 984 409 | | 3/2000 |
| EP | 1 067 491 | | 1/2001 |
| EP | 1 184 822 | | 6/2003 |
| GB | 2 090 690 | | 7/1982 |
| GB | 2 096 376 | | 10/1982 |
| GB | 2 097 160 | | 10/1982 |
| GB | 2 100 905 | | 1/1983 |
| GB | 2 105 891 | | 3/1983 |
| GB | 2 106 682 | | 4/1983 |
| GB | 2106682 | | 4/1983 |
| GB | 2 117 155 | | 10/1983 |
| GB | 2 130 413 | | 5/1984 |
| GB | 2130413 | | 5/1984 |
| GB | 2 137 392 | | 10/1984 |
| GB | 2 144 644 | | 3/1985 |
| GB | 2 161 008 | | 1/1986 |
| GB | 2 170 643 | | 8/1986 |
| GB | 2 181 589 | | 4/1987 |
| GB | 2 183 882 | | 6/1987 |
| GB | 2 191 030 | | 12/1987 |
| GB | 2 213 624 | | 8/1989 |
| GB | 2213624 | | 8/1989 |
| GB | 2 222 712 | | 3/1990 |
| GB | 2 225 889 | | 6/1990 |
| GB | 2 226 436 | | 7/1990 |
| GB | 2 242 300 | | 9/1991 |
| GB | 2 262 642 | | 6/1993 |
| GB | 2 316 214 | | 2/1998 |
| GB | 2316214 | | 2/1998 |
| GB | 2328311 | A | 2/1999 |
| WO | WO 85/00910 | | 2/1985 |
| WO | WO 99/64997 | | 12/1999 |
| WO | WO 00/12186 | | 3/2000 |
| WO | WO 01/15055 | | 3/2001 |
| WO | WO 01/26019 | | 4/2001 |
| WO | WO 01/28646 | | 4/2001 |
| WO | WO 02/077935 | | 10/2002 |
| WO | WO 02/102484 | | 12/2002 |
| WO | WO 03/089084 | | 10/2003 |
| WO | WO 03/089088 | | 10/2003 |
| WO | WO 2005/009560 | | 3/2005 |

OTHER PUBLICATIONS

Black Swan Advertisement written by IGT, published by prior to 2001.
Boxer, Aaron. Where Buses Cannot Go. IEEE Spectrum, Feb. 1995, pp. 41-45.
Bueschel, Richard M., Lemons, Cherries and Bell-Fruit-Gum, Nov. 1995, Royal Bell Books, pp. 295-296.
Christensen, David G., "Slot Machines a Pictorial Review," 1976, The Vestal Press, pp. 98-99.
Examination Report; New Zealand Application No. 504492; filed May 17, 2000 (cited in Form PTO-1449 received by the U.S. Patent and Trademark Office Jul. 24, 2000, in U.S. Appl. No. 09/573,131).
Fey, Marshall, Slot machines—A Pictorial History of the First 100 Years, 1997, Liberty Bell Books, 5th Ed., p. 13.
Free Fall Poker Brochure, written by IGT, available prior to 2001, in or before Dec. thereof.
Geddes, Robert N. Slot Machines on Parade, First Edition, The Mead Company, Long Beach, California, On or before Dec. 1976, pp. 120, 127, 138.
Jazzy Jackpots Advertisement written by Atronic Americas, published in Mar. 2001.
Jazzy Jackpots Article, published in Strictly Slots, Mar. 2001.
Neon Nights Advertisement, written by IGT, published in 2000, in or before December thereof.
Slot Machines Article written by Reno-Tahoe Specialty, Inc. published in 1989.
Super 8 Line Game (and Description) written by IGT, available prior to 2000.
The iGame Series Brochure written by IGT, available prior to 2000.
Tokenization Description written by IGT, available prior to 2001.
Vision Bonus Games Advertisement includes "Diamond Fives Buy-A-Bonus Spin," written by IGT, published in 1999 in or before December thereof.
Wagering on Paylines written by IGT, prior to Oct. 5, 2001.
Wheel of Fortune Paytable including progressive qualification written by IGT, published prior to 2000.
Wild Streak Brochures, written by WMS Gaming, Inc., published Mar. 2001.

* cited by examiner

GAMING SYSTEM AND METHOD HAVING WAGER ALLOCATION

PRIORITY CLAIM

This application is a continuation of, and claims priority to and the benefit of, U.S. patent application Ser. No. 13/279,021, filed on Oct. 21, 2011, which issued as U.S. Pat. No. 8,360,852 on Jan. 29, 2013, which is a continuation of, and claims priority to and the benefit of, U.S. patent application Ser. No. 12/017,246, filed on Jan. 21, 2008, which issued as U.S. Pat. No. 8,066,564 on Nov. 29, 2011, which is a continuation of, and claims priority to and the benefit of, U.S. patent application Ser. No. 10/861,072, filed on Jun. 3, 2004, which issued as U.S. Pat. No. 7,387,570 on Jun. 17, 2008, which claims priority to and the benefit of United Kingdom Patent Application No. GB 0313012.7, filed on Jun. 6, 2003, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

This invention relates to coin-operated player-operable entertainment machines, which may be gaming machines, such as so-called “fruit” or “poker” or “slot” machines, of the kind having a main display device operable, when actuated by a stake value, for play of a main game wherein symbols are selected and displayed at respective display positions at a win zone. As used herein, the term coin is intended also to cover tokens, charge or credit cards or any other means of supplying credit or monetary value.

The main display device of a gaming machine may comprise multiple side-by-side reels which are rotatable about a common horizontal axis within a housing behind a window at the win zone. Each reel has symbols equally spaced around its periphery and the reels can be brought to rest with one or more symbols on each reel displayed at the respective display positions in the window.

If the displayed combination of symbols at a predetermined combination of the display positions constitutes a predetermined winning combination an award may be made available to the player.

The reels may be actual mechanical reels in which case there are typically three or four reels with say three symbols on each reel displayed through the window, when the reel is at rest, one on a central horizontal win line and the other two respectively above and below this win line whereby a displayed winning symbol combination on display positions on this win line results in an award.

There may also be other win lines, horizontally above and below the central horizontal win line and/or vertically and/or diagonally whereby a displayed winning symbol combination on any of a selected combination of positions on any of a selected combination of such lines may result in an award.

The reels may be video simulated reels in which case it is feasible to provide more reel displays, say five reels, with more combinations of symbol positions used for win determination, say up to 20 or more position combinations.

BACKGROUND

It is known to provide the player with the opportunity of selecting the range of combinations of symbol positions, or ‘pay lines’, to be used for win determination, an appropriate multiple of a basic stake value being required for multiple paylines.

With such known machines an array or matrix of symbols is displayed to the player at the win zone. In the case of 4 reels each displaying 3 consecutive symbols a 3×4 matrix of 12 symbols is displayed. Each reel has a predetermined sequence of symbols, say 20 or 24 symbols, from which the group of 3 consecutive symbols is selected. The range of combinations within the matrix is thereby limited which consequently limits its award possibilities and player entertainment.

SUMMARY

An object of the present invention is to facilitate increase in range of combinations within such a symbol matrix thereby to enable award possibilities and player entertainment to be enhanced.

According to one aspect of the invention therefore there is provided a coin-operated player-operable entertainment machine of the kind having a main display device operable, when actuated by a stake value, for play of a main game wherein symbols are selected and displayed at respective display positions within a matrix at a win zone, whereby an award is made available in correspondence with display of at least one predetermined winning combination of symbols at at least one predetermined combination of said displayed positions, characterised in that said symbols are selected from respective independent symbol sequences for the said respective display positions.

With this arrangement, the resulting displayed matrix of symbols is derived using a respective symbol sequence for each display position, rather than using the same sequence for a group of such positions. An increased range of symbol combinations is therefore possible, whereby award possibilities and entertainment value can be enhanced.

There may be any number of display positions which may be arranged in any suitable configuration. In one embodiment a 10×10 square matrix of 100 display positions is used. However other numbers of positions, and other configurations other than square can also be used.

Most preferably there are multiple said predetermined combinations of display positions within the matrix which are used for win-determination. These combinations are preferably lines of display positions which may run in any one or more directions across the matrix e.g. vertical, horizontal, diagonal. These line combinations may each extend wholly across the matrix. Alternatively combinations may be used for win-determination which are not necessarily wholly across the matrix. Thus combinations are used which constitute any number of positions within a predetermined range, in a predetermined direction across the matrix. By way of example, any 3 or more consecutive positions in any horizontal, vertical, or diagonal line may be used. Alternatively, the player may receive awards for symbols that are scattered over the play area.

The predetermined combination or combinations of display positions used for win-determination are preferably fixed. However, if desired, provision may be made for these to be changed on a random or other basis, or to be deliberately pre-selected, by the machine and/or by the player e.g. in correspondence with stake value selection.

Where multiple combinations of display are used for win-determination the arrangement may be such that, in the case of multiple attained winning symbol combinations, the award corresponding to only one such winning combination, e.g. a highest such award, is made available. Alternatively or additionally multiple awards may be made available.

Most preferably, multiple awards are made available, although in this case preferably at least some such awards have a value lower than the said game stake value. In this respect, the stake value may be related to the number of display positions and the awards may be multiples of the stake value proportion per position. Thus with a 10×10 matrix of 100 positions, a basic said stake value may be $1 i.e. 1 cent per position, and the award values may be multiples of 1 cent.

Provision may be made for increasing stake value to effect corresponding multiplication of award values or to introduce new awards or symbols.

The displayed symbols may also be used to initiate bonus or jackpot features additional or alternative to the aforesaid symbol-combination win-determination. Thus for example, a predetermined combination of predetermined symbols at predetermined positions may result in a jackpot or bonus win. The predetermined positions and symbols may be the same as those used for non-jackpot or bonus win-determination e.g. a partial or complete horizontal, vertical or diagonal line of '7' symbols may result in a jackpot win. Alternatively or additionally, special predetermined symbols may be used for jackpot or bonus win-determination and the arrangement may be such that the jackpot or bonus is awarded if the special symbols are anywhere in the matrix or otherwise displayed not necessarily as required for the non-jackpot or bonus win-determination. Other jackpot or bonus or other supplementary features can also be provided e.g. 21 or more of the same symbol scattered about the play area may award a jackpot or other bonus.

A bonus feature which may be initiated by a win, or a special symbol, or any other event, may be a number of free symbol selections, say ten selections, though any number of selections is possible.

During these bonus selections, any displayed winning symbol combinations may be held over from that bonus selection to subsequent bonus selections. This would guarantee illumination of winning selections during the bonus feature. Alternatively, the player may be given the option to hold or discard the win in the hope of gaining a more lucrative win on a subsequent selection.

For example if a winning combination of symbols is attained on the first of ten bonus selections, these symbols would be held in position for the remaining nine bonus selections, and illumination of winning selections on each of the nine remaining bonus selections would be guaranteed for the player. This increases player enjoyment due to the potential to win multiple prizes.

In the case where the player has the option of increasing stake value, this may influence likelihood or value of a jackpot, bonus or other supplementary feature.

With regard to the win-determination this may occur automatically i.e. by automatic operation of the machine, in that whenever a game results in display of symbols including one or more predetermined winning combinations the corresponding award or awards are automatically made available to the player.

Alternatively, the arrangement may be such that partial or complete involvement of the player is required to identify the winning combination or combinations before the award or awards can be made available. Thus, the player may be required to indicate the display positions by using a keyboard, or touch screen or other device. The machine may provide assistance e.g. by indicating the nature of the winning combinations, by indicating some but not all of the winning combinations or otherwise.

With regard to the symbol sequences for each display position these may be of any suitable length and may include any suitable number of different symbols e.g. 14 different symbols distributed throughout a sequence of 20 or 24 symbols. Selection of a symbol from the sequence may be effected in any suitable manner preferably on a random or pseudo random basis.

The symbol sequences are preferably provided around the peripheries of respective actual or simulated rotatable reels whereby selection of a symbol at a matrix position involves a moving display of symbols at such position ending with one such symbol brought to rest at that position. Most preferably video-simulated reels are used whereby the entire matrix is defined by a video screen display.

Awards made available to the player may be of a monetary nature or coins which can be credited for use in playing further games and/or which can be paid out to the player.

DETAILED DESCRIPTION

Figure 1:
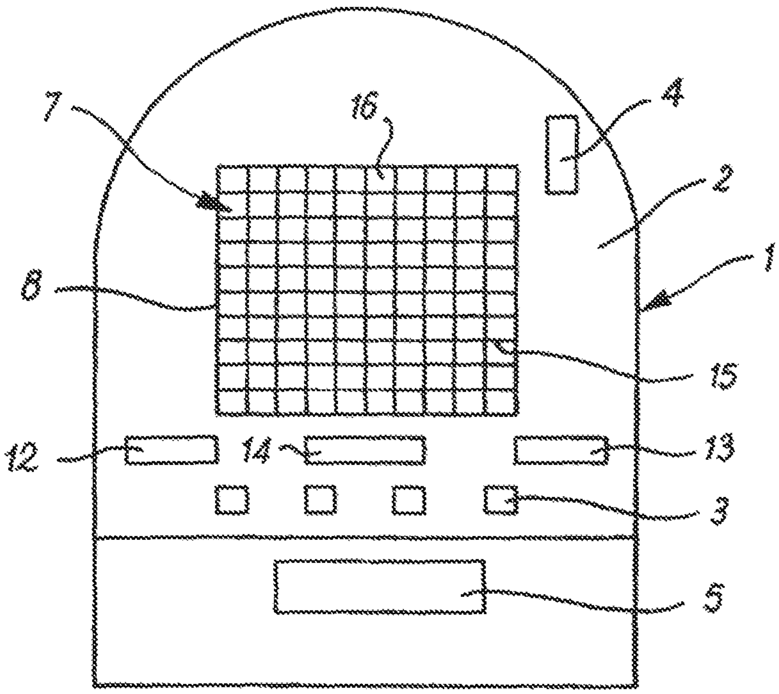
FIG. 1 is a diagrammatic front view of one form of a gaming machine according to the invention.
Figure 3:
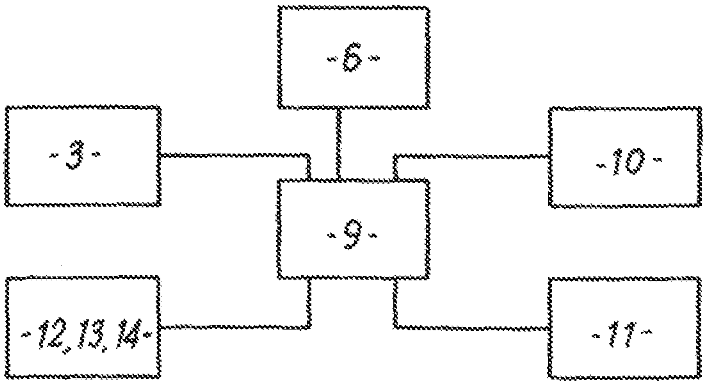
FIG. 3 is a diagrammatic block circuit diagram of the machine.

The invention will now be described further by way of example only and with reference to the accompanying drawings which, referring to FIG. 1, show a gaming machine having a housing 1 with an upper front panel 2, operating buttons 3, a coin slot 4 and a payout opening 5.

Within the housing 1 there is a vdu 6 such as a crt with a screen 7 which can be seen through a window 8 in the upper front panel 2.

The vdu 6 is connected within the housing 1 to a microprocessor-based control unit 9 as also are a coin mechanism 10, a payout mechanism 11, the operating buttons 3, and alphanumeric digital (LED or LCD) devices 12, 13, 14 visible on the front panel 2 alongside the screen 7.

Figure 2:
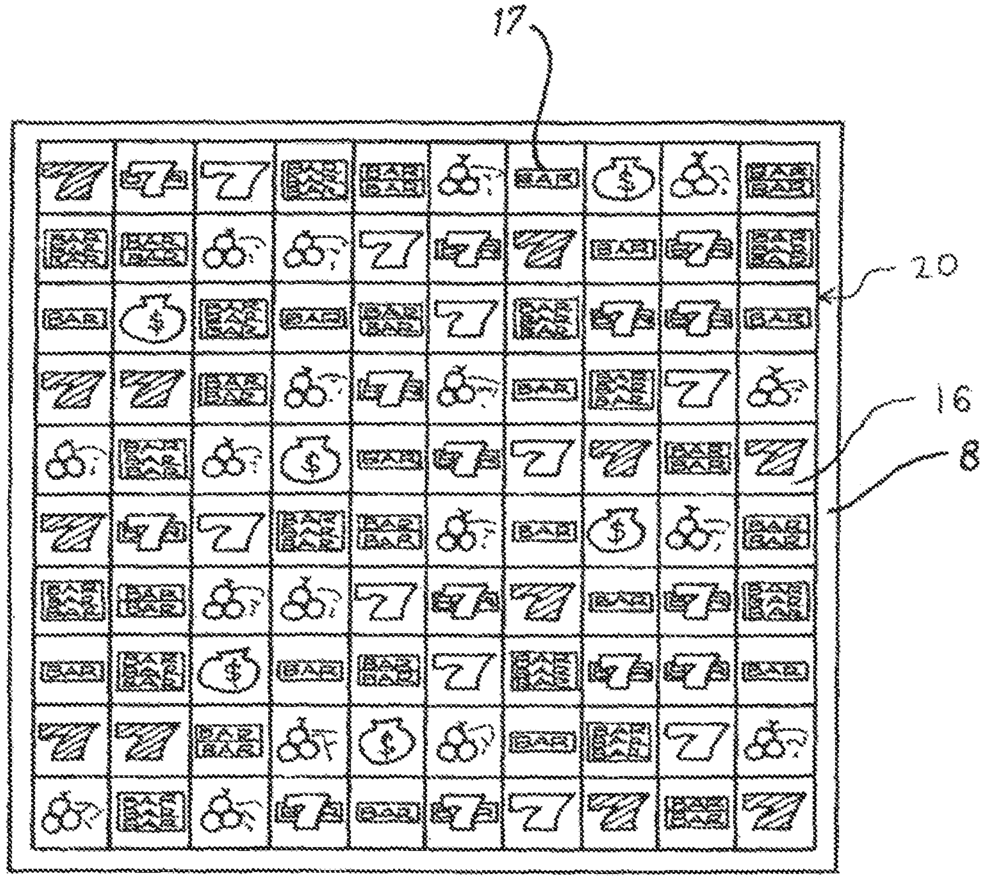
FIG. 2 is an enlarged front view of a main display device of the machine.

The screen 7 shows a square 10×10 matrix 15 of square display positions 16 each of which is capable of displaying a symbol 17 selected from a range of such symbols. As shown, in FIG. 2, the symbols 17 include a cherry picture, "7" in two different colours, one, two or three bars in three different colours, a special money bag picture, and a combination of "7" and BAR.

In use, the player inserts coins into the coin mechanism 10 through the coin slot 4 sufficient to generate credit for play of one or more games. A minimum stake value of $1, i.e. 1 cent for each of the 100 matrix positions 16, may be required. The total game play credit is shown on one of the digital devices 12. By operating appropriate buttons 3 the player can use this credit as stake value for play of a game in multiples of $1.

The stake value selected is shown on the device 14.

A game can now be started by pressing a start button 3. This causes a respective moving display to be produced at each of the 100 display positions 16 of the matrix 15. This display simulates rotation of a reel 20 having symbols 17 marked at equally spaced positions around its periphery. There may be say 14 different symbols in a sequence of 20 or 24 symbols (i.e. some symbols being repeated), and for each position 16 there may be the same or different such sequences.

After a randomly selected period of time, rotation of each simulated reel stops so that one symbol 17 from its respective sequence is randomly selected and displayed at rest at the respective position 16. The periods of time may be similar for each position 16 or may be selected in accordance with any desired pattern.

The resulting static display of 100 symbols 17 is now assessed for win determination purposes along predetermined lines of positions 16 in the matrix 15. These lines may be all horizontal, vertical and corner to corner diagonal lines i.e. 22 lines in total.

Within each such predetermined line a combination of three or more identical symbols 17 at consecutive positions 16 constitutes a winning combination, with a corresponding award.

Thus for example, credit units may be made available for award as follows:

| | |
|---|---|
| 3 identical symbols | 2 units |
| 4 identical symbols | 10 units |
| 5 identical symbols | 50 units |
| 6 identical symbols | 500 units |
| 7 identical symbols | 1000 units |
| 8 identical symbols | 2000 units |
| 9 identical symbols | 5000 units |
| 10 identical symbols | 10000 units |

The arrangement is such that the maximum award value is made available in any line having 3 or more consecutive identical symbols 12.

If two or more lines contain 3 or more consecutive identical symbols 17, a corresponding award is made available for each such line.

The value of the award units depend on the original stake value. Each unit is equal to 1 cent in the case where the minimum stake ($1) is wagered. If the minimum stake is multiplied to say $5, the unit value is 5 cents.

Thus, there is the possibility of multiple awards being made available regularly without necessarily exceeding the stake value. By way of example, a bet of $1 could result in one 50 cent, three 10 cent and 42 cent wins which provides interest and entertainment to the player whilst retaining 12 cents of the stake value.

When the game results in winning combinations, the corresponding award value may be automatically credited to the player and added to the credit value shown on the device 12. At the same time the winning combinations may be highlighted by illumination or flashing of the positions 16 or otherwise. The accumulated credit value can be used by the player to fund further games and/or a payout of coins can be obtained by operating a payout button, such paid out value being transferred to the device 13.

Alternatively, the arrangement may be such that available award value is only credited after the player has correctly identified the winning combinations. Thus, when the static symbol display is produced the player may be required to indicate the combinations e.g. by touching the screen at the appropriate positions 16 to actuate touch screen controls. This may be done against a limit of time or otherwise.

In this way the player has to find the combinations and derives further playing entertainment from this, essentially in the manner of a 'wordsearch' puzzle.

Guidance may be given to help the player in finding the combinations e.g. by indicating the nature of the combinations on a screen display (not shown) or by highlighting one symbol from each combination or otherwise. The player may also be given the opportunity of deciding whether to rely on the machine, or to find the combinations independently of the machine, and the latter selection may involve an incentive.

In addition to the above mentioned winning combinations, awards may also be made available in accordance with jackpot or bonus features, for example whenever the 'money bag' symbol 17 is displayed anywhere in the matrix 15.

The bonus feature may be a number of free symbol selections, say ten free selections. If during a free symbol selection a winning sequence of symbols 17 occurs along predetermined lines of display positions 16, these symbols will be held over in position for subsequent free symbol selections during the bonus feature e.g. a winning sequence of symbols on the first of ten selections will be held in position for the remaining nine selections guaranteeing at least one winning outcome for the remaining spins.

The arrangement is such that an award is guaranteed for each of the remaining subsequent free spins, enhancing player enjoyment due to multiple awards being made available.

An increase in stake value may disproportionately increase likelihood or value of bonus or jackpot feature e.g. a five fold increase in stake value may give a 6 fold increase in jackpot value.

With the embodiment described 100 symbols in a 10×10 matrix are independently randomly selected from respective symbol sequences. This gives a large number of different combinations which can be assessed for win determination along a large number of different win lines.

This gives rise to increased award possibilities and consequent enhanced player interest and entertainment value. Moreover, much interest and entertainment can be derived from 'finding' the winning combinations in the matrix, in the manner of a word search puzzle, especially where the player is required to be involved in the identification of the combinations.

It is of course to be understood that the invention is not intended to be restricted to the details of the above embodiment which are described by way of example only. Thus, for example, if desired, other distributions of positions may be used for win determination purposes e.g. diagonal not necessarily corner to corner, sequences not necessarily linear, etc.

The invention is claimed as follows:

1. A gaming system comprising:

at least one display device;

at least one input device;

at least one processor; and at least one memory device storing a plurality of instructions which, when executed by the at least one processor, cause the at least one processor to operate with the at least one display device and the at least one input device to:

(a) display a plurality of symbol display areas, each of the symbol display areas being configured to display one of a plurality of different symbols;

(b) for a first play of a game:

(i) generate and display one of the symbols at each of the symbol display areas;

(ii) determine whether at least one of a plurality of different winning symbol combinations is displayed; and (iii) for each of any displayed winning symbol combinations, determine any awards for said displayed winning symbol combination based on a quantity of symbols included in said displayed winning symbol combination; and (c) for a second subsequent play of the game:

(i) redisplay the symbols included in any winning symbol combinations generated and displayed in the first play of the game at the symbol display areas at which said symbols were displayed in the first play of the game;

(ii) generate and display one of the symbols at each of the symbol display areas not displaying any of the redisplayed symbols;

(iii) determine whether at least one of the winning symbol combinations is displayed; and (iv) for each of any displayed winning symbol combinations, determine any awards for said displayed winning symbol combination based on a quantity of symbols included in said displayed winning symbol combination.

2. The gaming system of claim 1, wherein a quantity of any displayed winning symbol combinations in the second play of the game is at least equal to a quantity of any displayed winning symbol combinations in the first play of the game.

3. The gaming system of claim 1, wherein a sum of any awards provided for the second play of the game is greater than a sum of any awards provided for the first play of the game.

4. The gaming system of claim 1, wherein the plurality of instructions, when executed by the at least one processor, cause the at least one processor to, for a third subsequent play of the game:

(i) redisplay the symbols included in any winning symbol combinations generated and displayed in the second play of the game at the symbol display areas at which said symbols were displayed in the second play of the game;

(ii) generate and display one of the symbols at each of the symbol display areas not displaying any of the redisplayed symbols;

(iii) determine whether at least one of the winning symbol combinations is displayed; and (iv) for each of any displayed winning symbol combinations, determine any awards for said displayed winning symbol combination based on a quantity of symbols included in said displayed winning symbol combination.

5. The gaming system of claim 1, wherein the first play of the game and the second play of the game are free plays of the game.

6. The gaming system of claim 1, wherein the plurality of instructions, when executed by the at least one processor, cause the at least one processor to operate with the at least one display device and the at least one input device to provide the first play and the second play of the game upon an occurrence of a triggering event associated with a wagered-on play of the game.

7. A method of operating a gaming system, said method comprising:

(a) causing at least one processor to execute a plurality of instructions stored in at least one memory device to operate with at least one display device to display a plurality of symbol display areas, each of the symbol display areas being configured to display one of a plurality of different symbols;

(b) for a first play of a game, causing the at least one processor to execute the plurality of instructions to:

(i) operate with the at least one display device to generate and display one of the symbols at each of the symbol display areas;

(ii) determine whether at least one of a plurality of different winning symbol combinations is displayed; and (iii) for each of any displayed winning symbol combinations, determine any awards for said displayed winning symbol combination based on a quantity of symbols included in said displayed winning symbol combination; and (c) for a second subsequent play of the game, causing the at least one processor to execute the plurality of instructions to:

(i) operate with the at least one display device to redisplay the symbols included in any winning symbol combinations generated and displayed in the first play of the game at the symbol display areas at which said symbols were displayed in the first play of the game;

(ii) operate with the at least one display device to generate and display one of the symbols at each of the symbol display areas not displaying any of the redisplayed symbols;

(iii) determine whether at least one of the winning symbol combinations is displayed; and (iv) for each of any displayed winning symbol combinations, determine any awards for said displayed winning symbol combination based on a quantity of symbols included in said displayed winning symbol combination.

8. The method of claim 7, wherein a quantity of any displayed winning symbol combinations in the second play of the game is at least equal to a quantity of any displayed winning symbol combinations in the first play of the game.

9. The method of claim 7, wherein a sum of any awards provided for the second play of the game is greater than a sum of any awards provided for the first play of the game.

10. The method of claim 7, which includes causing the at least one processor to execute the plurality of instructions to operate with the at least one display device to, for a third subsequent play of the game:

(i) redisplay the symbols included in any winning symbol combinations generated and displayed in the second play of the game at the symbol display areas at which said symbols were displayed in the second play of the game;

(ii) generate and display one of the symbols at each of the symbol display areas not displaying any of the redisplayed symbols;

(iii) determine whether at least one of the winning symbol combinations is displayed; and (iv) for each of any displayed winning symbol combinations, determine any awards for said displayed winning symbol combination based on a quantity of symbols included in said displayed winning symbol combination.

11. The method of claim 7, wherein the first play of the game and the second play of the game are free plays of the game.

12. The method of claim 7, which includes causing the at least one processor to execute the plurality of instructions to operate with the at least one display device and at least one input device to provide the first play and the second play of the game upon an occurrence of a triggering event associated with a wagered-on play of the game.

13. The method of claim 7, which is provided through a data network.

14. The method of claim 13, wherein the data network is an internet.

15. A non-transitory computer readable medium storing a plurality of instructions which, when executed by at least one processor, cause the at least one processor to:

(a) cause at least one display device to display a plurality of symbol display areas, each of the symbol display areas being configured to display one of a plurality of different symbols;

(b) for a first play of a game:

(i) generate and cause the at least one display device to display one of the symbols at each of the symbol display areas;

(ii) determine whether at least one of a plurality of different winning symbol combinations is displayed; and (iii) for each of any displayed winning symbol combinations, determine any awards for said displayed winning symbol combination based on a quantity of symbols included in said displayed winning symbol combination; and (c) for a second subsequent play of the game:

(i) cause the at least one display device to redisplay the symbols included in any winning symbol combinations generated and displayed in the first play of the game at the symbol display areas at which said symbols were displayed in the first play of the game;

(ii) generate and cause the at least one display device to display one of the symbols at each of the symbol display areas not displaying any of the redisplayed symbols;

(iii) determine whether at least one of the winning symbol combinations is displayed; and (iv) for each of any displayed winning symbol combinations, determine any awards for said displayed winning symbol combination based on a quantity of symbols included in said displayed winning symbol combination.

16. The non-transitory computer readable medium of claim 15, wherein a quantity of any displayed winning symbol combinations in the second play of the game is at least equal to a quantity of any displayed winning symbol combinations in the first play of the game.

17. The non-transitory computer readable medium of claim 15, wherein a sum of any awards provided for the second play of the game is greater than a sum of any awards provided for the first play of the game.

18. The non transitory computer readable medium of claim 15, wherein the plurality of instructions, when executed by the at least one processor, cause the at least one processor to, for a third subsequent play of the game:

(i) cause the at least one display device to redisplay the symbols included in any winning symbol combinations generated and displayed in the second play of the game at the symbol display areas at which said symbols were displayed in the second play of the game;

(ii) generate and cause the at least one display device to display one of the symbols at each of the symbol display areas not displaying any of the redisplayed symbols;

(iii) determine whether at least one of the winning symbol combinations is displayed; and (iv) for each of any displayed winning symbol combinations, determine any awards for said displayed winning symbol combination based on a quantity of symbols included in said displayed winning symbol combination.

19. The non-transitory computer readable medium of claim 15, wherein the first play of the game and the second play of the game are free plays of the game.

20. The non-transitory computer readable medium of claim 15, wherein the plurality of instructions, when executed by the at least one processor, cause the at least one processor to provide the first play and the second play of the game upon an occurrence of a triggering event associated with a wagered-on play of the game.

* * * * *